Oct. 4, 1932.   W. SCHMIDT   1,881,136
CYCLE SADDLE
Filed March 30, 1931
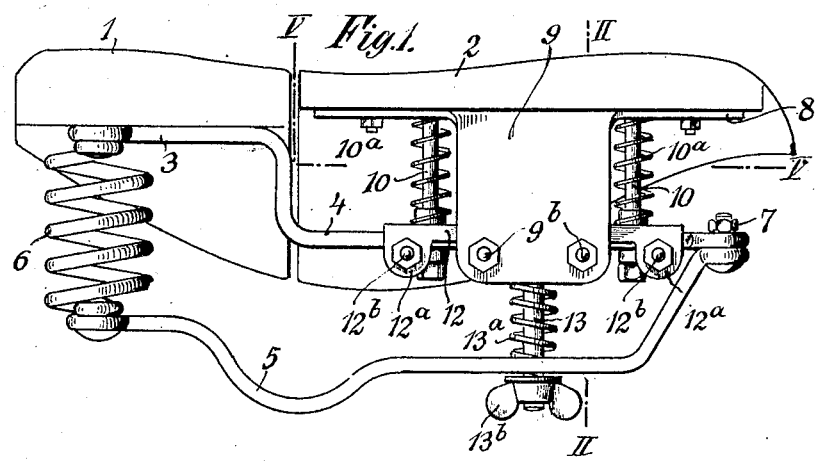
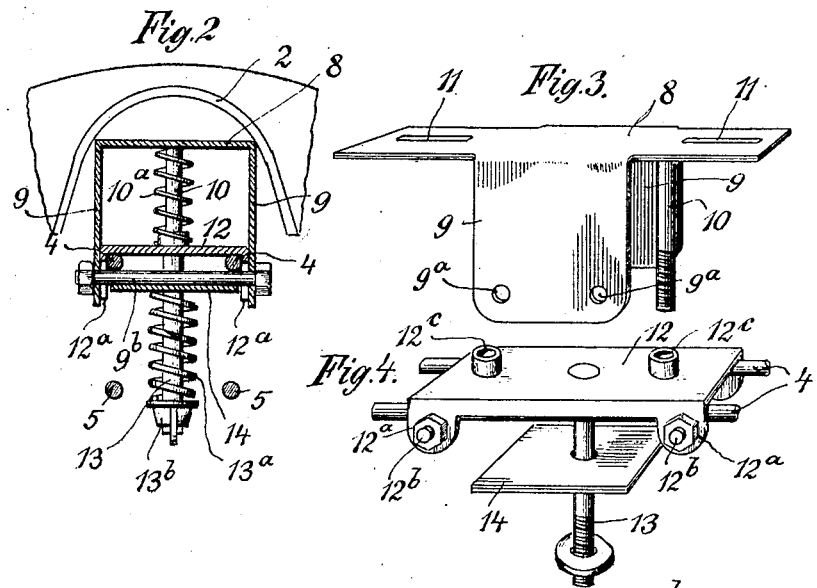
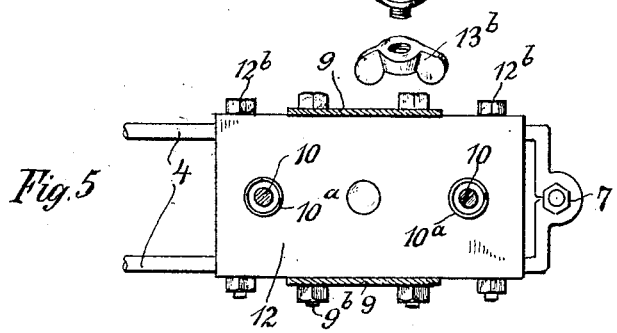

Patented Oct. 4, 1932

1,881,136

UNITED STATES PATENT OFFICE

WILHELM SCHMIDT, OF BRESLAU, GERMANY

CYCLE SADDLE

Application filed March 30, 1931, Serial No. 526,380, and in Germany April 9, 1930.

This invention relates to a two-part cycle or motor cycle saddle with front and rear seating surface, by which a distribution of the weight of the body is obtained and consequently fulfills an important condition for an improved seating because the main weight of the cyclist rests on the wide bowless rear seat, whereas only the remaining weight loads the front seating surface, that is that portion of the saddle at which otherwise a sensitive pressure makes itself apparent.

The characteristic feature of the invention consists in that the regulation of the tension of the supporting spring of the front seating surface according to its load is effected, independently of the rear seating surface, by vertical shifting of the front seating surface, this being effected in the simplest manner in that on the upper, specially shaped longitudinal saddle springs a bridge is arranged on which the front seating surface is parallelly guided with the aid of a projection. Consequently the front seating surface retains the horizontal position imparted thereto by the springing.

Besides entirely overcoming the fundamental objection, namely the strong front springing, the new spring tensioning device under the front seating surface also causes this latter to uniformly spring along its entire length according to the load and this springing to occur at a point where the springing of the rear saddle springs is still perceivable.

Thus a uniform springing of the whole of the two-part seating surface is obtained without affecting the safe sitting of the cyclist.

Moreover the invention presents the vary great advantage, that the two seating surfaces require no subsequent tensioning as they are well sprung once and for all and remain so. The former hanging of the body in a trough shaped depression in the leather seat is therefore excluded.

An embodiment of the invention is illustrated by way of example in the accompanying drawing in which:—

Fig. 1 shows the saddle in side elevation.

Fig. 2 is a section on line II—II of Fig. 1.

Figs. 3 and 4 show perspective views of several parts of the spring tension device.

Fig. 5 is a section on line V—V of Fig. 1.

The saddle consists of a wide rear seat 1 and of a narrow, independent front seat 2, which are made of any metal with suitable bolstering. The wide rear seat rests on the rear ends 3 of the upper saddle spring 4. This saddle spring 4 is connected in the usual manner at the rear to the lower saddle spring 5 by a spiral spring 6 or by other means of suspension, whereas the springs 4 and 5 are connected together at the point of the saddle by a bolt 7 or the like. On the front seat 2 a plate 8 is fixed by screws, which plate has lateral guide walls 9, 9 and guide bolts 10, 10. The plate 8 has longitudinal slots 11, 11 (Fig. 3) so that it can be adjusted as desired relative to the saddle seat 2. On the two parallel extending arms of the upper saddle spring 4 a bridge 12 is placed, which can be adjusted by shifting on the spring 4 and which engages laterally around the arms of the spring 4 with lugs 12a and can be fixed on the spring 4 by bolts 12b. This bridge 12 is provided with guide sleeves 12c for the bolts 10 of the saddle plate 8. On the under side of the bridge 12 a bolt 13 is fixed. When fitting together the spring tensioning device the spiral springs 10a are slipped on the bolts 10, the bolts 10 inserted in the sleeves 12c of the bridge 12 and secured by screwing on the nuts 12d. The side walls 9 of the saddle plate 8 have bores 9a (Fig. 3) through which, after the saddle plate 8 has been placed on the bridge 12, the bolts 9b are inserted so that they bear from below against the arms of the spring 4. A counter plate 14 is slipped on the bolt 13 of the bridge 12 and bears from below against the bolts 9b, 9b, the spring 13a being then slipped on the bolt 13, the tension of this spring being regulated as desired by a nut 13b.

By means of the nuts 12d a certain rigid connection is established between the saddle plate 8 and the whole saddle and the front saddle part 2 first bears only on the two springs 10a, 10a. This saddle connection is further strengthened by means of the two side walls 9 of the saddle plate 8 with their limiting bolts 9b and, as the spiral springs 13a of the bolt 13 bear from below against the bolts 9b of the guide parts 9 of the saddle plate 8 through the intermediary of the plate 14, the spring 13a exerts through the plate 14 also a resilient effect on the saddle plate 8 through the intermediary of the bolts 9b. The entire front saddle seat 2 therefore rests first on the two thin springs 10a, but at the same time through the intermediary of the bolts 9b, also on the plate 14, which in turn is carried by the strong spiral springs 13a situated thereunder.

In this construction the cyclist can, by tightening or loosening the wing screws 13b, obtain any desired springing of the front saddle seat, which is a primary condition for a comfortable, hygienically perfect cycling. Further advantages derived from this construction in conjunction with the dividing of the seating surface have already been mentioned above.

I claim:—

1. A two part cycle saddle, comprising in combination a front seat, a rear seat, supporting springs for the front seat, and means for regulating the tension of said supporting springs according to the load independently of the rear seat by vertical shifting of said front seat.

2. A two part cycle saddle consisting of a front seat and a rear seat, comprising an upper saddle spring, a bridge connected to the front seat and engaging over said upper saddle spring, and guides coacting with said bridge to guide said front seat in parallel direction.

In testimony whereof I affix my signature.

WILHELM SCHMIDT.